US008657025B2

(12) United States Patent
Thompson et al.

(10) Patent No.: US 8,657,025 B2
(45) Date of Patent: *Feb. 25, 2014

(54) FOLDING FRAME FOR AN AGRICULTURAL IMPLEMENT

(75) Inventors: Kent L. Thompson, Otley, IA (US);
Michael R. Vaske, Knoxville, IA (US);
Rustin V. Bentzinger, Pella, IA (US);
Michael Kindley, Oskaloosa, IA (US)

(73) Assignee: Forage Innovations B.V., PA Maassluis (NL)

( * ) Notice: Subject to any disclaimer, the term of this patent is extended or adjusted under 35 U.S.C. 154(b) by 672 days.

This patent is subject to a terminal disclaimer.

(21) Appl. No.: 12/793,439

(22) Filed: Jun. 3, 2010

(65) Prior Publication Data

US 2011/0017480 A1 Jan. 27, 2011

Related U.S. Application Data

(63) Continuation of application No. 12/482,567, filed on Jun. 11, 2009, now Pat. No. 8,267,186.

(60) Provisional application No. 61/313,398, filed on Mar. 12, 2010.

(51) Int. Cl.
*A01B 49/00* (2006.01)

(52) U.S. Cl.
USPC ............................ 172/311; 172/776; 56/385

(58) Field of Classification Search
USPC ................... 172/311, 376, 776; 56/377, 385
See application file for complete search history.

(56) References Cited

U.S. PATENT DOCUMENTS

| 2,226,586 | A | * | 12/1940 | Seaholm | 172/240 |
|---|---|---|---|---|---|
| 3,466,860 | A | | 9/1969 | Winkel | |
| 3,778,987 | A | | 12/1973 | Rankins | |
| 4,319,643 | A | * | 3/1982 | Carter et al. | 172/311 |
| 4,364,581 | A | * | 12/1982 | Shoup | 172/311 |
| 4,504,076 | A | * | 3/1985 | Bedney | 172/311 |
| 4,582,143 | A | * | 4/1986 | Pratt | 172/311 |
| 4,660,651 | A | * | 4/1987 | Pfenninger et al. | 172/311 |
| D298,139 | S | | 10/1988 | Van Staveren | |
| 4,947,631 | A | | 8/1990 | Kuehn | |
| 5,062,260 | A | | 11/1991 | Tonutti | |
| 5,305,590 | A | | 4/1994 | Peeters | |

(Continued)

FOREIGN PATENT DOCUMENTS

| AU | 456215 | 12/1974 |
|---|---|---|
| AU | 1678076 | 3/1978 |
| DE | 3034870 | 4/1982 |
| WO | 88/01470 | 3/1988 |

OTHER PUBLICATIONS

International Search Report—mailed Feb. 23, 2011.

*Primary Examiner* — Jamie L McGowan
(74) *Attorney, Agent, or Firm* — Strum & Fix LLP

(57) ABSTRACT

A folding frame for an agricultural implement such as a wheel rake. The frame includes ground engaging wheels and two toolbars foldable for operation and for transport. The folding frame is provided flexibility to conform to uneven surfaces, yet stability against the torques and forces of operation. A slidable tongue provides folding action between the transport position and the operating position. A spacing between rear ends of the two toolbars may be altered hydraulically for wider or narrower windrows. A novel caster wheel provides support for the toolbars and is located so that the implement's transport position is narrower than the prior art's.

25 Claims, 18 Drawing Sheets

(56) References Cited

U.S. PATENT DOCUMENTS

| | | |
|---|---|---|
| 5,493,853 A | 2/1996 | Tonutti |
| 5,540,040 A | 7/1996 | Peeters |
| 5,598,691 A | 2/1997 | Peeters |
| 5,685,135 A | 11/1997 | Menichetti |
| 5,752,375 A | 5/1998 | Tonutti |
| 5,899,055 A | 5/1999 | Rowse |
| 5,918,452 A | 7/1999 | Kelderman |
| 6,038,844 A | 3/2000 | Peeters |
| 6,314,710 B1 | 11/2001 | Tonutti |
| 6,865,873 B2 | 3/2005 | Menichetti |
| 6,945,024 B2 | 9/2005 | Tonutti |
| 7,165,386 B2 | 1/2007 | Tonutti |
| 7,360,353 B2 | 4/2008 | Hruska |
| 7,469,648 B2 * | 12/2008 | Bettin ............................... 111/52 |
| 7,584,595 B2 * | 9/2009 | Marggi et al. .................... 56/385 |
| 8,235,133 B2 * | 8/2012 | Friggstad ....................... 172/386 |
| 8,267,186 B2 * | 9/2012 | Kindley et al. ................ 172/311 |
| 2003/0233820 A1 | 12/2003 | Menichetti |
| 2005/0210856 A1 * | 9/2005 | Menichetti ....................... 56/377 |
| 2006/0090910 A1 * | 5/2006 | Houck ........................... 172/272 |
| 2007/0033915 A1 | 2/2007 | Vaske |

\* cited by examiner

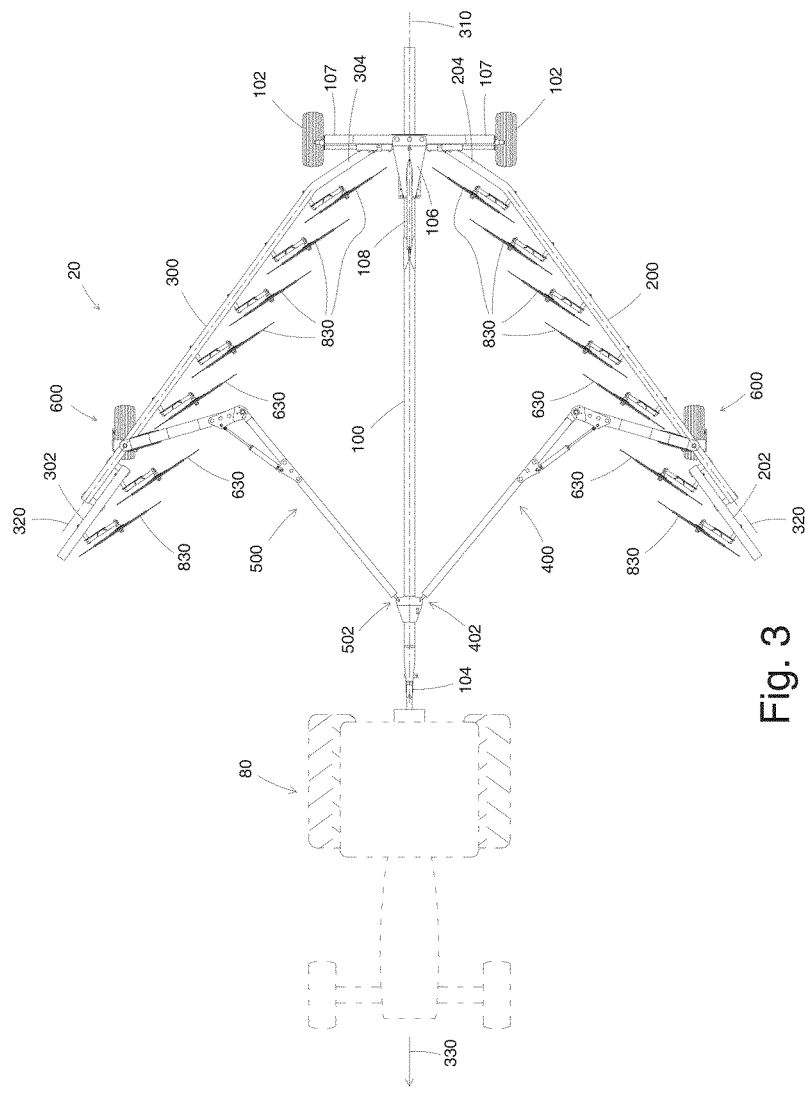

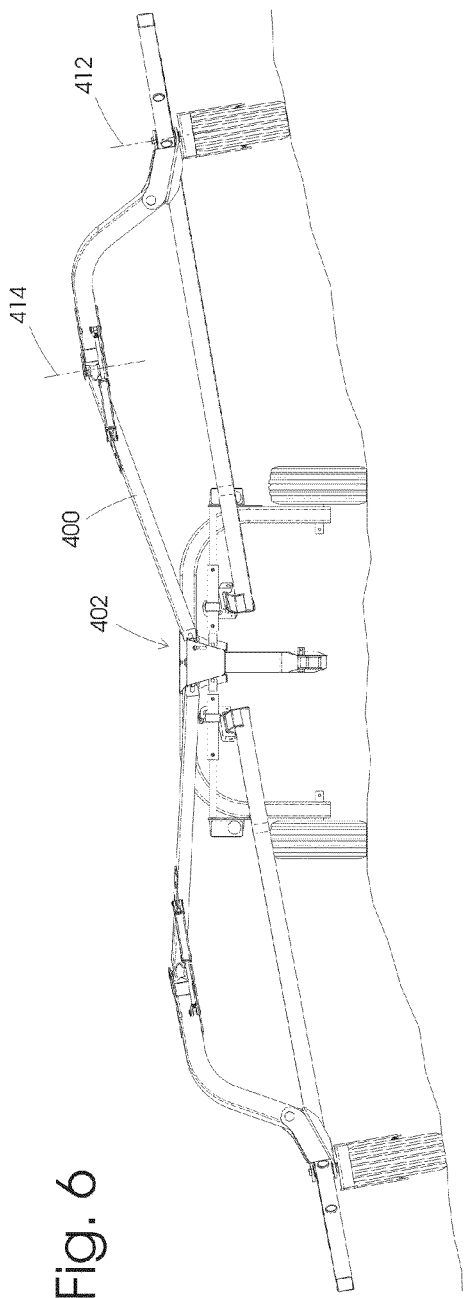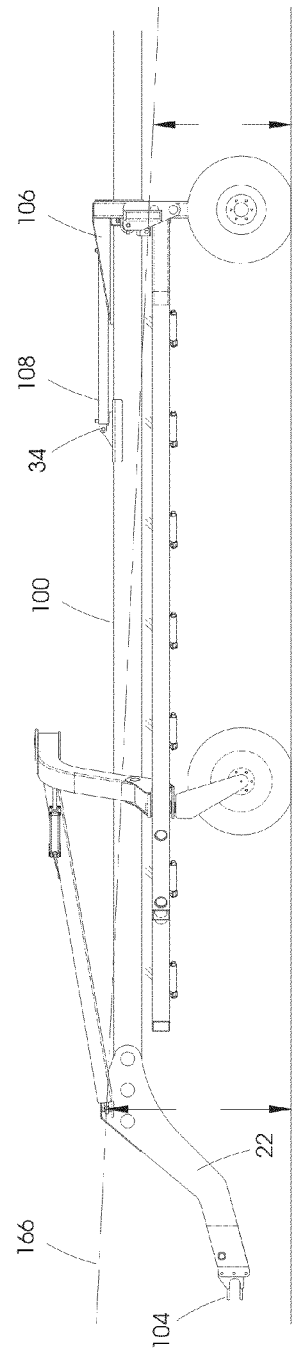

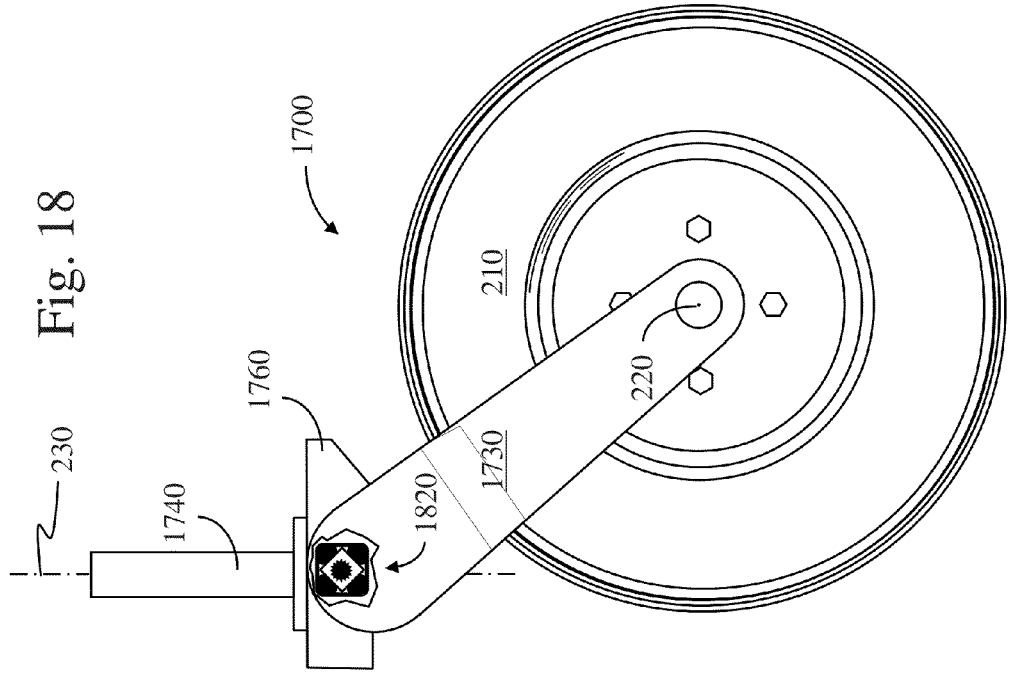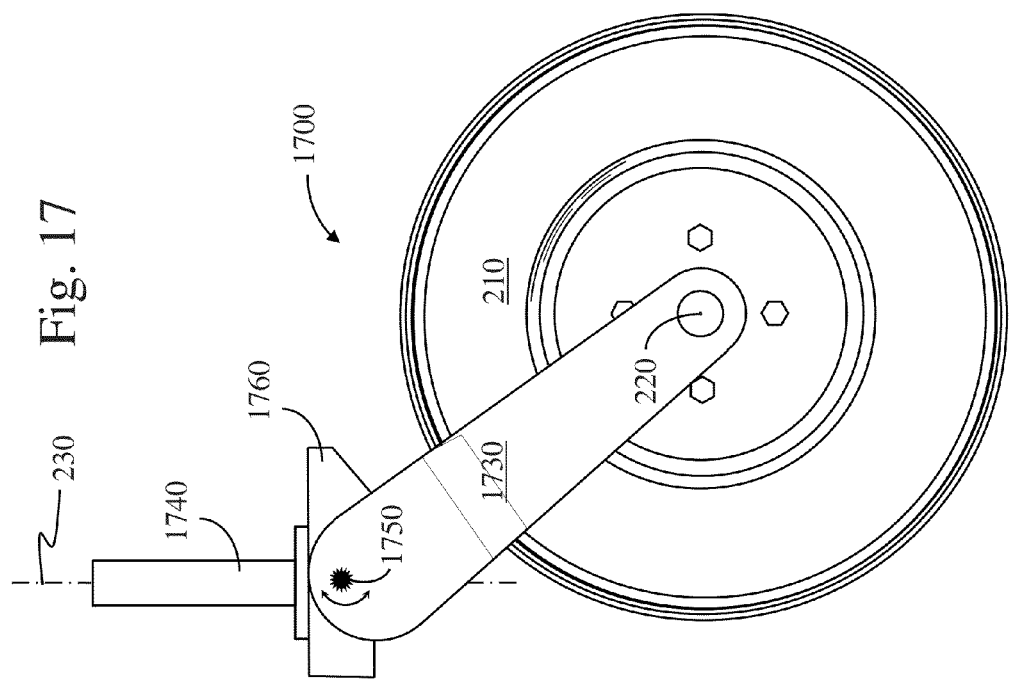

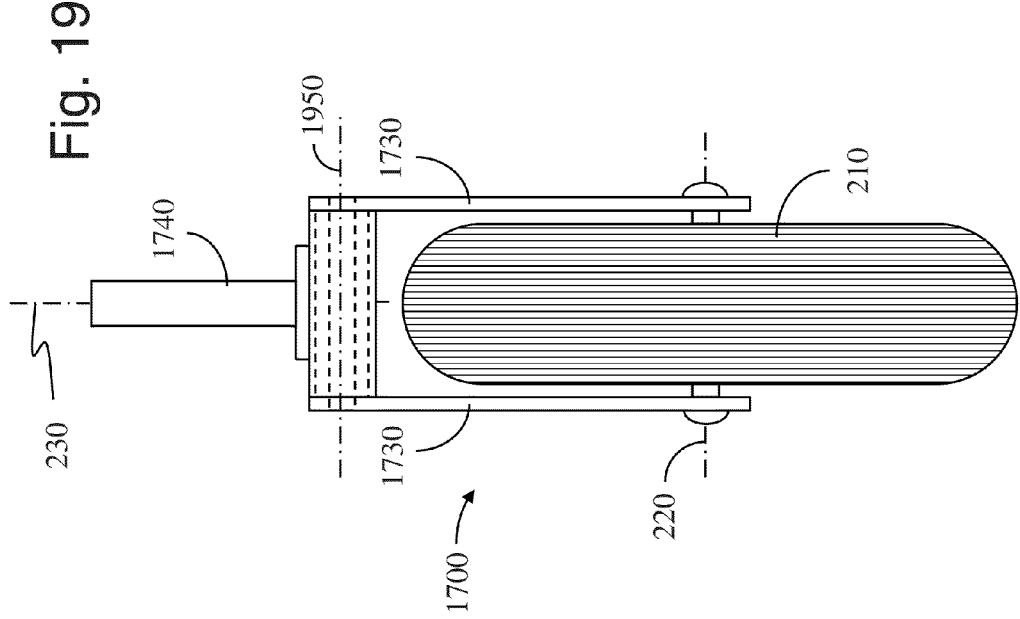

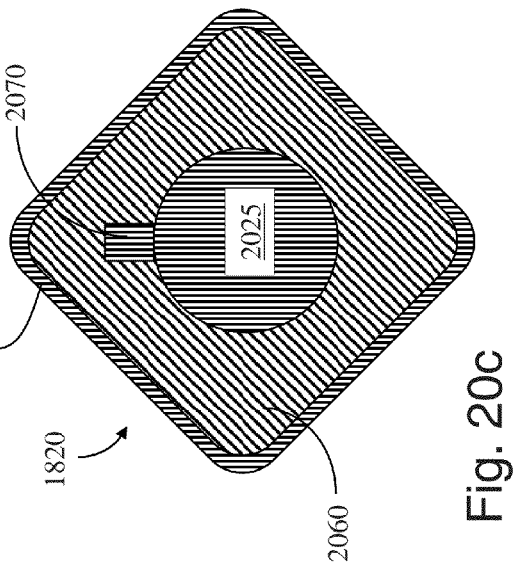
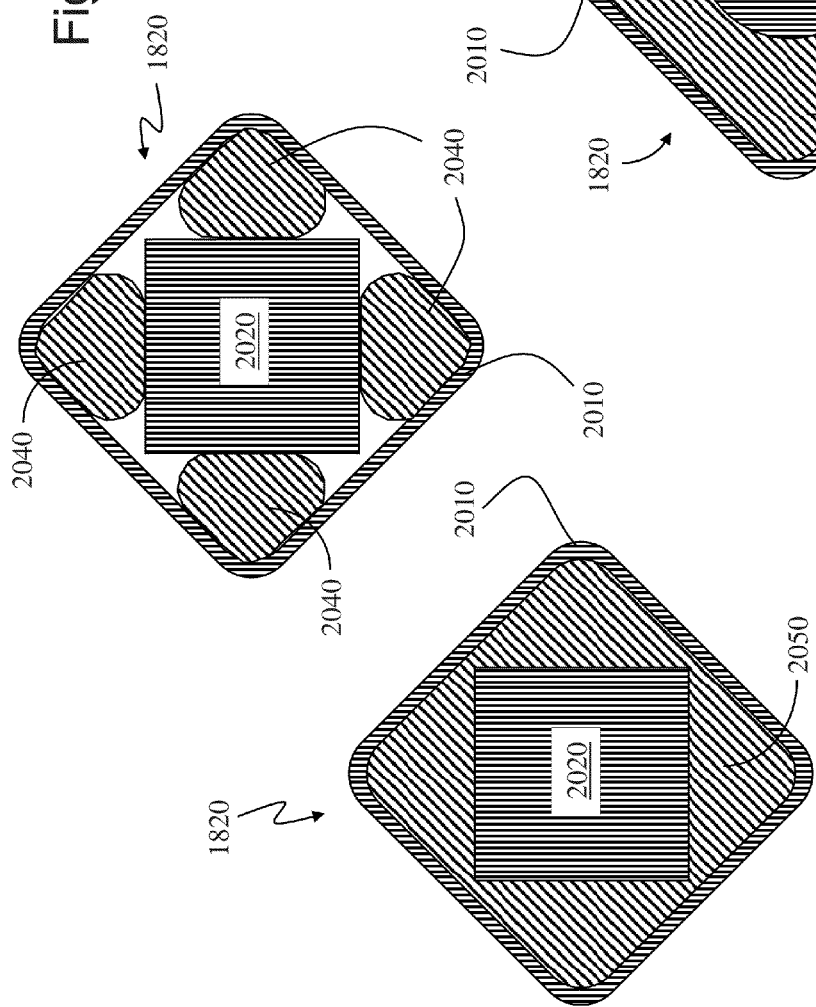

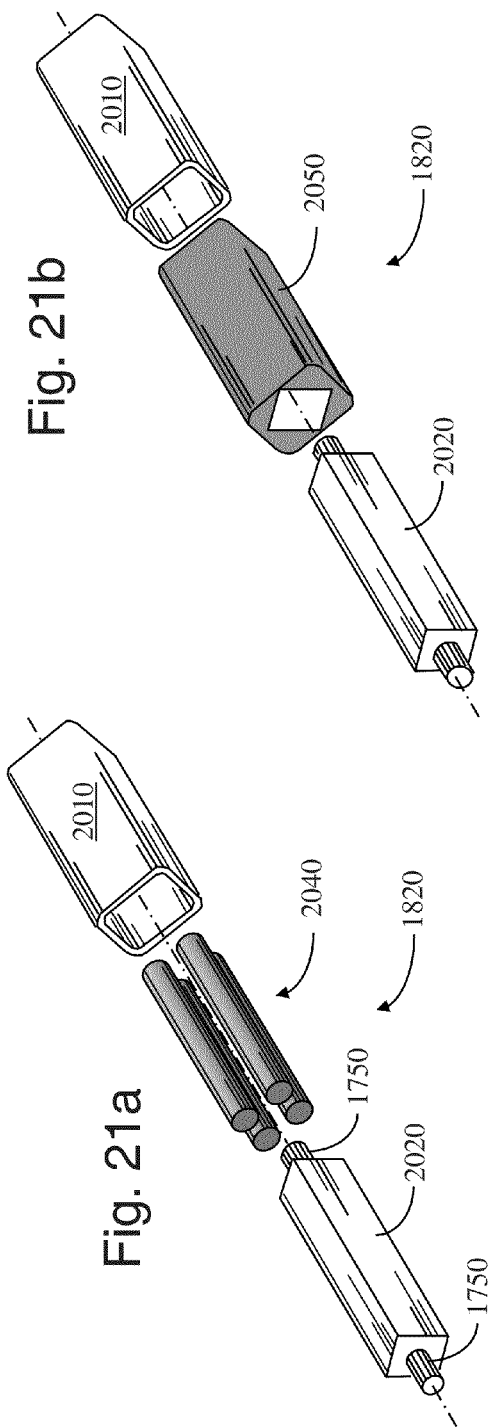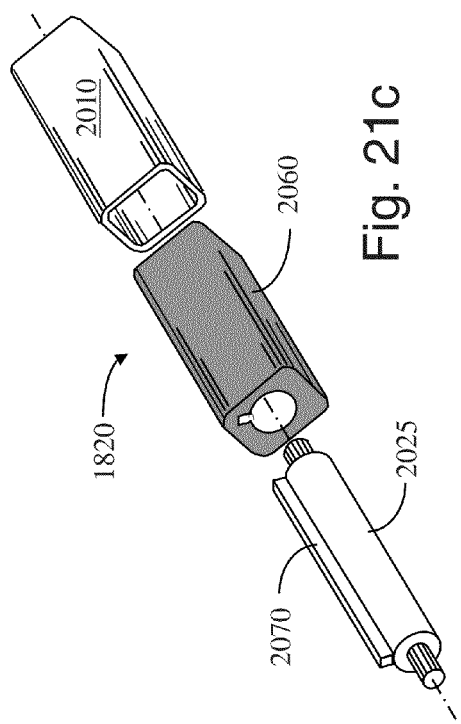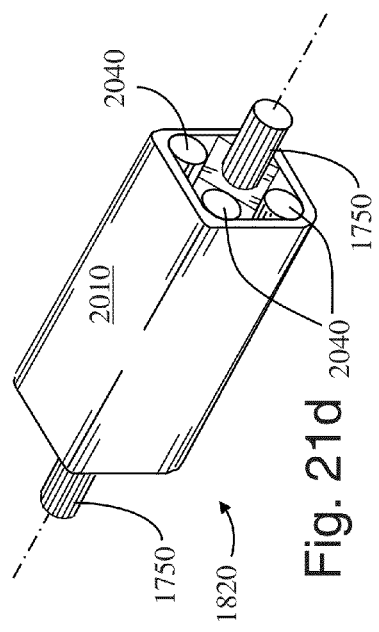

FOLDING FRAME FOR AN AGRICULTURAL IMPLEMENT

CROSS REFERENCE TO RELATED APPLICATIONS

This is a Continuation-in-Part of U.S. patent application Ser. No. 12/482,567, filed Jun. 11, 2009, now U.S. Pat. No. 8,267,186 and which also claims benefit of U.S. Ser. No. 61/313,398, filed Mar. 12, 2010.

Priority is claimed from both of the above identified applications and both are incorporated herein by reference in their entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an agricultural implement including a folding toolbar. More particularly, the present invention relates to an improved method and apparatus for providing stability for the folding toolbar as well as flexibility when operating on uneven terrain.

2. Background Art

As farm implements are made to cover greater areas in a single pass, components of those implements become longer and, thus, exhibit greater tendencies to flex, twist, and generally deform. Incorporating appropriate flexibility of farm implement frames—to conform to uneven terrain—while maintaining adequate stability—that is, resist flexing, twisting, and deforming—are challenges faced by implement designers.

Many types of agricultural implements include folding toolbars, including, but not limited to, agricultural wheel rakes. The folding toolbars may be supported at an end farthest from a tongue by a ground engaging wheel or wheels, such as that shown in FIGS. 2a and 2b. Due to the distance between the ground engaging wheel and the rear end of the toolbar, impulses to the ground engaging wheel because of uneven ground and obstacles can result in damage to the toolbar and other parts of the implement.

In the past, the ground engaging wheel attached to the toolbar has been mounted on the side of the toolbar away from the tongue of the implement as seen in FIG. 1. The width of the implement when folded for transport is greater due to the location of the ground engaging wheel. Other choices of location, while narrowing the folded implement have proved untenable because of interference between the ground engaging wheel and other moving parts of the implement.

An improvement to the former problem—that of impulses to the ground engaging wheel 10—can be made by increasing the diameter of the ground engaging wheel. However, it has been found, increasing the diameter of the ground engaging wheel requires an increase in an offset 240, which is the horizontal distance between a substantially vertical axis 230 and a substantially horizontal axis 220 as seen in FIG. 2a. If the offset 240 is not increased with tire diameter, instability results, with a symptom of shimmy. The combination of the increased wheel diameter and the requisite increased offset 240 results in a much greater clearance requirement. The ground engaging wheel must be disposed adequately far from the parts of the implement with which the wheel may interfere.

Forces due to obstructions in the path of the ground engaging wheel, as well as forces due to operating the implement in the field, can result in deformations of the folding toolbar. Prior art implements have utilized joints with limited degrees of freedom to provide rigidity to resist these deformations. However, the joints with limited degrees of freedom have not permitted the folding toolbars to adequately conform to uneven terrain.

The must be foldable between a transport configuration, sufficiently narrow to pass through a gate or traverse public roadways, and a broadened operating configuration. It is also desirable to provide varying windrow widths.

Most folding wheel rakes on the market today that fold by changing the tongue length, do so by using folding arms or telescoping frame members. This causes the working or operational length to be unnecessarily longer, making it more difficult for the operator to turn the tractor and rake at the end of each windrow.

There is, therefore, a need for an agricultural implement including a folding toolbar having ground engaging wheels at outboard ends of the toolbars mounted so as to reduce the folded width of the implement. There is an additional need for the ground engaging wheel to reduce impulse on the toolbar due to uneven ground or obstacles. There is also a need for a folding toolbar providing both conformability to uneven field surfaces and stability under the influence of the loads realized in use of the implement. There is a further need for a folding toolbar wherein the overall length of the implement remains short. There is also a need for a folding toolbar on a wheel rake providing for varying windrow widths.

BRIEF SUMMARY OF THE INVENTION

An object of the present invention is to provide a method and apparatus for mounting a caster wheel to a toolbar, such as that used on wheel rakes, that results in a narrower folded width.

For the purposes of the present disclosure, including the claims, a caster wheel is defined as a wheel assembly, 10, 100, as shown in FIGS. 1a-2c, the wheel 210 having a substantially horizontal axis of rotation 220 substantially at a center of area of the wheel 210, and about which the wheel 210 rotates. The wheel assembly 10, 100, further has a substantially vertical axis 230 of rotation providing steering of the wheel 210. The wheel assembly 10, 100 rotates about the substantially vertical axis 230 of rotation relative to the implement toolbar (not shown in FIGS. 2a-2c). The substantially horizontal axis of rotation 220 rotates about the substantially vertical axis of rotation 230. The wheel assembly 10, 100 may, optionally, be locked so the wheel assembly 10, 100 will not rotate about the substantially vertical axis 230 for some of the operation of the implement. However, to meet the definition of a caster wheel, the wheel assembly 10, 100 must include a substantially vertical axis of rotation 230 and the wheel assembly 10, 100 must rotate about said substantially vertical axis of rotation 230 during at least some of the caster wheel's operation. The definition of the caster wheel also demands the caster wheel include a load bearing, ground engaging wheel 210. Specifically, a rake wheel, with tines about its periphery for engaging forage material and applying it to a windrow, does not satisfy the definition of a caster wheel, for the purposes of this document, regardless of the rake wheel's axes of rotation.

To effect the above object, the toolbar of the implement includes a first portion, pivotally attached to a main frame of the implement and extending generally forward from the pivotal connection. A second portion of the toolbar is parallel to, but not collinear with, the first portion of the toolbar. The second portion of the toolbar is set inward—that is, toward the tongue—from the first portion of the toolbar, and comprises a forward end of the toolbar assembly. The caster wheel may then be disposed such that the substantially vertical axis of rotation of the caster wheel assembly lies between the first and second portions of the toolbar.

Because of the offset of the second portion of the toolbar inward from the first portion of the toolbar, a spacing between the rake wheels must be increased, thus providing room for the caster wheel assembly.

An additional object of the instant invention is to provide a suspension system for the caster wheel providing support for an agricultural implement toolbar. Torsion axles are used for axles for wheels that are not caster wheels. An example use is on trailer axles. Application of the torsion shaft to a caster wheel is novel. The torsion shaft provides a substantially horizontal axis of pivot about which forks pivot. Pivoting the forks permits the toolbar to which the caster wheel assembly is pivotally attached to raise and lower while the ground engaging wheel of the caster wheel engages the ground. Due to the effect of the torsion axle, these movements—raising and lowering—are damped, thus reducing accelerations and consequent forces.

Still another object of the present invention is to provide a folding toolbar assembly having sufficient rigidity to resist the deformations of its members due to operation while at the same time, providing the flexibility of the assembly to conform to uneven and varying terrain.

Fold arms extending between a joint operatively attached to the tongue and a joint operatively attached to the toolbars provide resistance to moments produced when the rake wheels are engaged to forage material in the field. In addition, due to the novel use of a ball joint for the fold arms at the tongue, each fold arm has three degrees of rotational freedom at the tongue. A novel joint also providing three degrees of rotational freedom connects a rear end of each toolbar to a frame. Thus, torsional loads to the toolbars must be supported by the fold arms. The joint between each fold arm and the respective toolbar provides only a single degree of rotational freedom—in a substantially vertical direction. So torsional loads on the toolbars are resisted by the fold arms.

An additional object of this invention is to provide a sliding tongue that effects the folding of the toolbar. The folding toolbar is adapted to be operatively attached to a prime mover such as a farm tractor for towing from place to place. First and second toolbars, attached to and moved by the tongue member, are pivotally attached to linkage members and pivotal joints permit the folding toolbar apparatus to be moved between a narrow and longer transport position and a shorter and wider working position, while at the same time retaining flexibility in use. The rear end of the tongue member extends behind the frame in the operating position, making the folding toolbar apparatus shorter than conventional folding toolbars in the operating position.

Another object of the present invention is to provide variable windrow widths. To effect this object, the rear end of each toolbar is operatively, pivotally attached to the frame in a slidable fashion. A spacing between the rear ends of the first and second toolbars may be made greater or smaller via this sliding function, which is preferably carried out hydraulically.

Other objects, advantages and novel features of the present invention will become apparent from the following detailed description of the invention when considered in conjunction with the accompanying drawings.

BRIEF DESCRIPTION OF THE DRAWINGS

FIG. 3 is a top plan view of an agricultural wheel rake in operating position;
FIG. 6 is a second front elevation view of the agricultural implement frame in operating position on uneven ground;
FIG. 7 is a side elevation view of the agricultural implement frame;
FIG. 17 is a side elevation view of a caster wheel assembly of the present invention;
FIG. 18 is a side elevation view of the caster wheel assembly of the present invention showing a torsion shaft;
FIG. 19 is a front elevation view of a caster wheel assembly of the present invention;
FIG. 20a is an internal view of a first form of the torsion shaft;
FIG. 20b is an internal view of a second form of the torsion shaft;
FIG. 20c is an internal view of a third form of the torsion shaft;
FIG. 21a is an exploded view of the first form of the torsion shaft;
FIG. 21b is an exploded view of the second form of the torsion shaft;
FIG. 21c is an exploded view of the third form of the torsion shaft;
FIG. 21d is a perspective view of the first form of the torsion shaft, assembled.

DETAILED DESCRIPTION OF THE INVENTION

Figure 4:
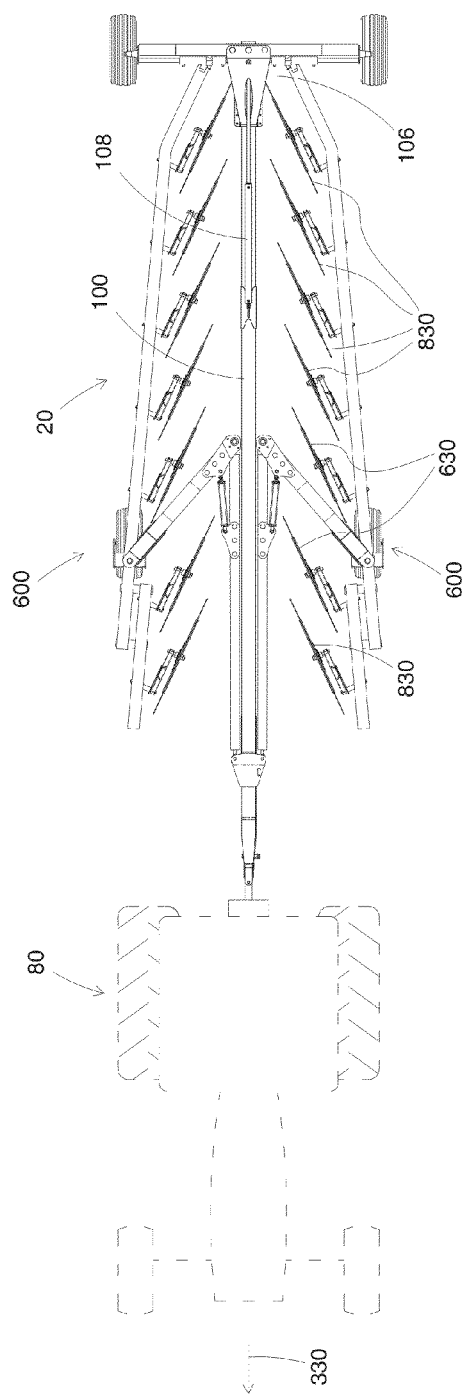
FIG. 4 is a top plan view of the agricultural wheel rake in transport position.

Referring now to the drawings wherein like reference numerals indicate identical or corresponding parts throughout the several views, the implement 20 of the present invention is shown in FIG. 3, including a plurality of rake wheels 630, 830 operatively, rotatably attached to a left toolbar 200 and a right toolbar 300. The implement 20 is depicted in the operational position and towed by a tractor 80 in FIG. 3. In FIG. 4, the same implement 20 is depicted in a transport position and towed by the tractor 80.

An elongated tongue member 100 is shown in FIGS. 3, 4 and 7, operatively attached at a front end to a hitch structure 22 while at a rear end the elongated tongue member 100 is disposed in and extends through a slide box 106. The slide box 106 is operatively, rigidly attached to a frame 107. The frame 107 comprises downwardly depending portions for rotatably mounting ground-engaging transport wheels 102.

The tongue includes a hitch 104. The hitch 104 is supported by a drawbar of the agricultural tractor 80.

Figure 16:
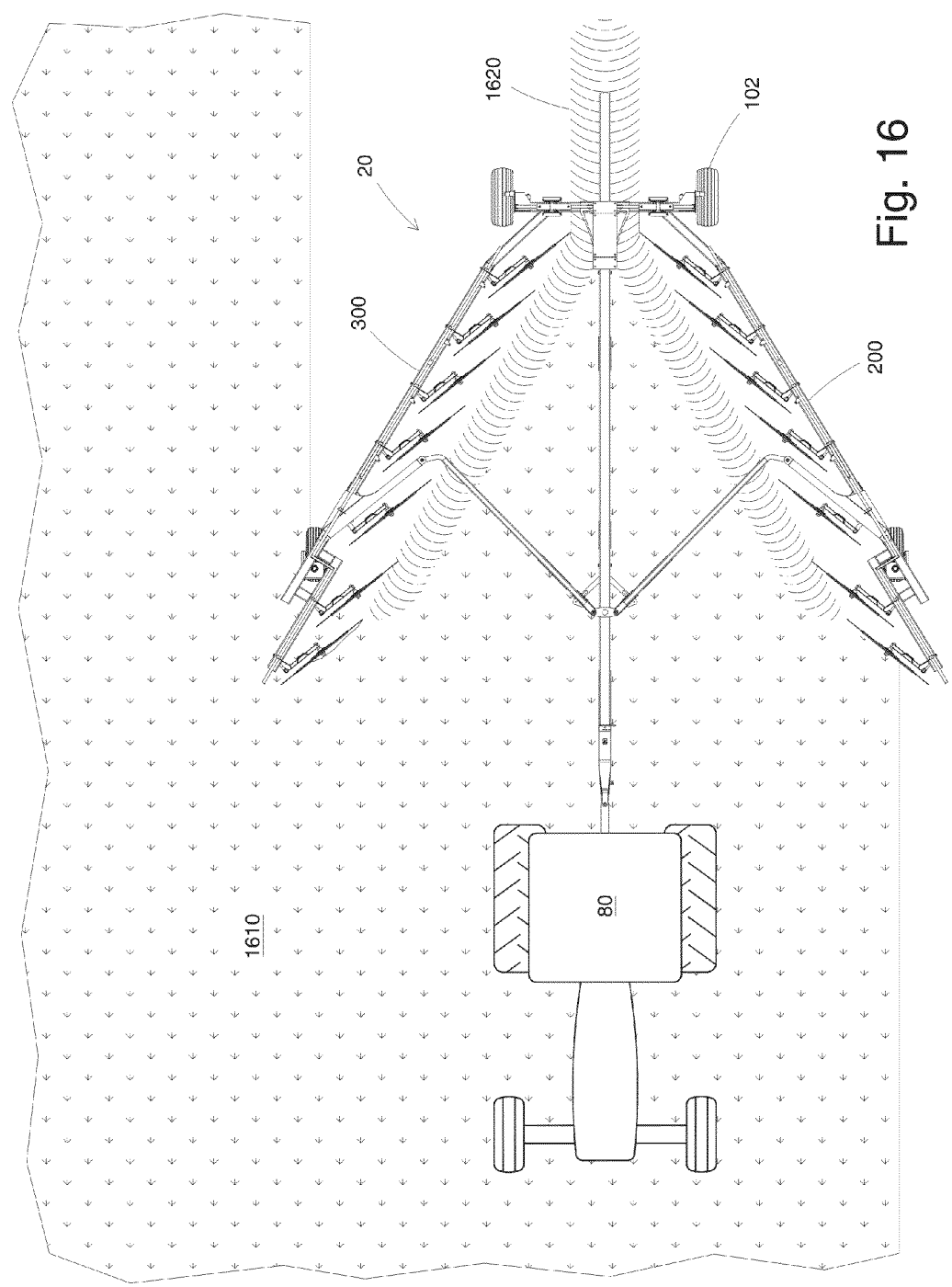
FIG. 16 is a top plan view of the agricultural wheel rake in operation raking forage and pulled by an agricultural tractor.

A hydraulic cylinder 108, best seen in FIGS. 3, 4 and 7, is attached at a joint 34 on a substantially horizontal axis to the elongated tongue member 100 and is attached at the other end to the frame 107, supported by the transport wheels 102. It is the lengthening or shortening of the hydraulic cylinder 108 that moves the tongue member 100 between the transport position shown in FIG. 4 and the operational position shown in FIG. 3. In the transport position of FIG. 4, the implement 20 may pass through farm gates and travel on a road or highway and be sufficiently narrow to avoid extending into adjacent lanes of traffic. Once the folding implement 20 is pulled into a field by the tractor 80 shown in FIG. 3, the hydraulic cylinder 108 is shortened causing the frame 107 to move with respect to the elongated tongue 100 to the position shown in FIG. 3 which is the working or operating position of the toolbars 200, 300. In FIG. 16, cut crop material 1610, such as hay, shown in front of the folding implement 20 with rake wheels 630, 830 is shown being raked by the implement 20 into a windrow 1620 as the rake moves forwardly over the cut crop 1610. Of course when the task of windrowing the entire field has been completed and it is desired to go back through a gate and onto a public road or highway, the hydraulic cylinder 108 is lengthened to the position shown in FIG. 4 thus moving the folding implement 20 to the transport position shown in FIG. 4.

Another aspect of the present invention comprises a caster wheel assembly 1700 shown in FIGS. 17-19. The caster wheel of the instant invention includes the substantially horizontal axis of rotation 220 about which the wheel 210 turns, and the substantially vertical axis of rotation 230 about which the entire caster wheel assembly 1700 rotates. The substantially vertical axis may exist by virtue of a stem 1740, fitted into bearings in the implement.

The caster wheel of the present invention also includes a novel use of a torsion shaft assembly 1820. The forks 1730 are permitted to pivot relative to the stem 1740 about a substantially horizontal pivot axis 220.

Several variations of torsion shaft assemblies 1820 are shown in FIGS. 20a-21d. Torsion shaft assemblies 1820 comprise an outer housing 2010, usually being formed from material generally known as square tubing; an axle 2020, 2025, sometimes in the form of square stock as in FIGS. 20a-20b, 21a-21b, and 21d or round stock with a key 2070, as shown in FIGS. 20c and 21c; and at least one elastic member 2040, 2050, 2060.

The at least one elastic member 2040, 2050, 2060 may comprise a plurality of separate elastic members 2040, or a single elastic member 2050, 2060, molded to fit into the outer housing 2010 and to receive the axle 2020, 2025. The at least one elastic member 2040, 2050, 2060 is usually made of an elastomer, and commonly referred to by those of ordinary skill in the art as rubber.

The axle 2020, 2025, besides being either square or round stock, has splines 1750 machined or attached onto the ends as shown in FIGS. 21a-21d. The splines 1750 engage apertures in the forks 1730 while the outer housing 2010 is stationary with respect to the stem 1740. In this way, when the forks 1730 are rotated relative to the stem 1740, a resisting torque is generated in the torsion shaft assembly 1820.

Regardless of the configuration, when the axle 2020, 2025 is rotated relative to the outer housing 2010, the at least one elastic member 2040, 2050, 2060 is deformed, resulting in a resistance, in the form of a torque, to the rotation. A resisting torque results from rotation of the axle 2020, 2025 in either direction from a neutral position. In the neutral position, either there is no deformation of the at least one elastic member 2040, 2050, 2060 or any deformation is axisymmetric about an axis of rotation of the axle 2020, 2025. In either case, no torque is sustained about the axle 2020, 2025 in the neutral position.

An alternative to the common torsion shaft assemblies 1820 shown in FIGS. 20a-21d is the use of a torsion spring—a coiled spring that is deflected by the axle 2020, 2025 when the axle 2020, 2025 rotates relative to the stem 1740.

The present invention is not limited to any one form of torsion shaft assembly.

The housing 2010 of the torsion shaft assembly 1820 is rigidly attached to the caster wheel assembly's stem block 1760, which remains stationary relative to the stem 1740. The forks 1730 of the caster wheel assembly 1700 are rigidly attached to the axle 2020, 2025 of the torsion shaft assembly 1820 via the splines 1750. Therefore, the forks 1730 are permitted to pivot relative to the stem block 1760, with the dampening effect of the elastomer 2040, 2050, 2060.

The caster wheel assembly 1700 with a torsion shaft assembly 1820 as shown in FIGS. 20a-20c provides a dampening of forces to the toolbar 200, 300 from irregularities in the ground surface, hit by the wheel 210 of the caster wheel assembly 1700 in motion. Dampening these forces reduces noise, vibration, and fatigue.

An additional aspect of the present invention is shown as applied to an agricultural wheel rake shown in FIGS. 3 and 4. The caster wheel assembly 600 of either FIGS. 2a-2b 10 or FIGS. 17-19 1700 is disposed inward on the toolbar 200, 300 compared to the prior art (contrast FIG. 1 to FIG. 3). The inward placement of the caster wheel assemblies 600 exhibits the advantages of better supporting the force due to the moment applied to the toolbar by virtue of the raking process, and a narrower implement profile when the implement is folded to its transport mode as shown in FIG. 4.

For the purposes of the present document, including the claims, the term inward is defined as toward a longitudinal centerline 310 shown in FIG. 3. For example, the caster wheel assemblies 600 in FIG. 3 are disposed inwardly compared to the caster wheel assemblies 10 of FIG. 1. A distance inward from the toolbar is a distance inward from a nearest point on an imaginary line 320 passing through a middle of the toolbar toward the longitudinal centerline 310. For this definition, the imaginary line 320 shall be considered infinite in length, so this inward distance from the toolbar may be defined forward and rearward of the toolbar in question.

For the purposes of the present document, including the claims, the term forward is defined as the usual and general operating direction 330 as shown in FIG. 3. The term rearward is defined as opposite forward. Similarly the term front is defined as the forward-most portion of the implement. Rear is defined as opposite the front.

For the purposes of the present document, including the claims, the term towed agricultural implement is defined as an agricultural implement with ground engaging means, for example wheels, independent of the source of motive power, for example a farm tractor. Therefore, a towed implement is pulled by the source of motive power and may use the source of motive power's hydraulic system for raising and lowering, but does not make use of lift arms usually attached to a farm tractor.

For the purposes of the present document, including the claims, the adjective narrow is defined as a reduced distance between extreme outer points of the implement from the longitudinal centerline 310. Narrow refers to a distance measured perpendicular to the longitudinal centerline 310. The verb narrow is defined as the operation of reducing the distance between extreme outer points of the implement from the longitudinal centerline 310. Specifically, the verb narrow is not synonymous with shorten, which means a reduction in a length measured parallel to the longitudinal centerline 310.

For the purposes of the present document, including the claims, the transverse direction is hereby defined as a direction perpendicular to the forward direction, and lying in a plane substantially parallel to the ground on which the implement is disposed. Equivalently, the transverse direction is the direction parallel to an axis of rotation of the ground engaging rear wheels 102 shown in FIGS. 3 and 4.

Figure 9:
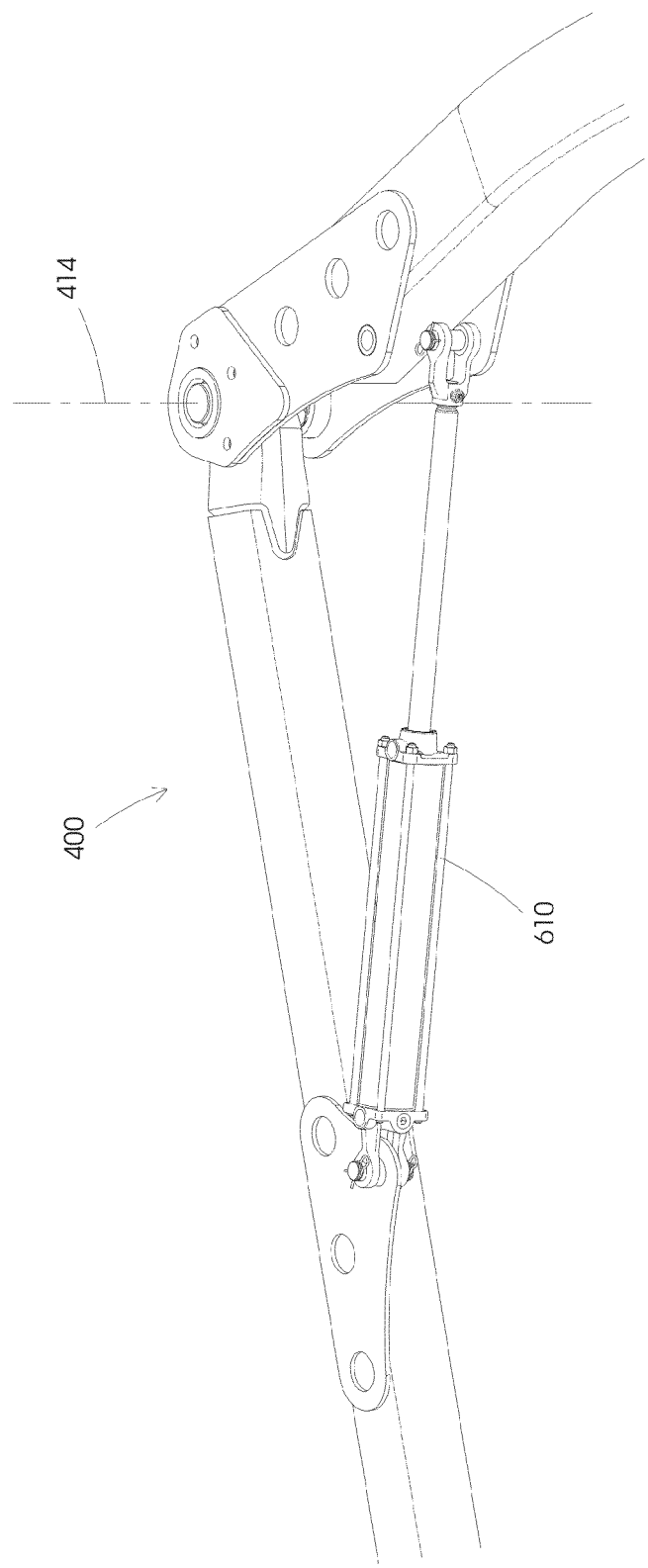
FIG. 9 is a detail of a center fold arm joint.

For the purposes of the present document, including the claims, an axial distance is hereby defined as a distance measured along a line parallel to the axis of rotation of the rake wheels 630, 830 (see a, b, and c in FIG. 9). The rake wheels 630, 830 can be for example of the type shown as rake wheel 32 in U.S. Pat. No. 6,945,924, which patent is incorporated herein by reference in its entirety.

To provide adequate clearance between each caster wheel 600 and the nearest rake wheels 630, each toolbar 200, 300 includes a forward section 202, 302, rigidly attached to the toolbar 200, 300. Furthermore, the forward section 202, 302 is parallel to and inwardly offset from the respective toolbar 200, 300 to which it is attached.

Figure 23:
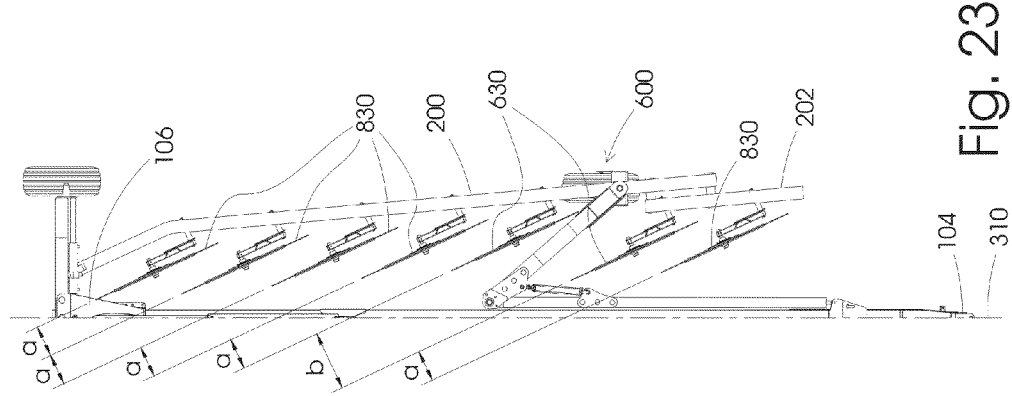
FIG. 23 is a top plan view of one toolbar in folded or transport mode showing rake wheel spacings.
Figure 22:
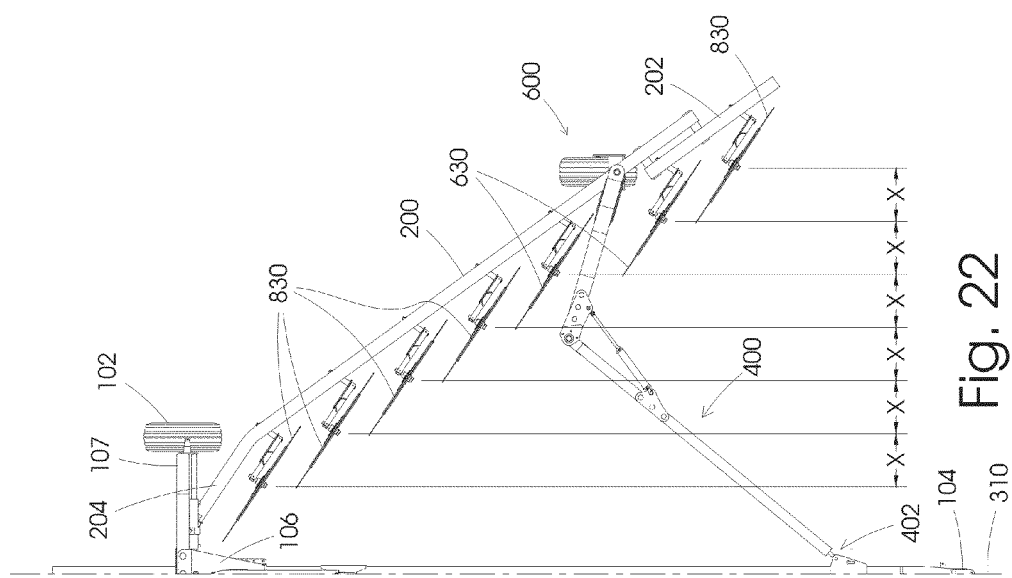
FIG. 22 is a top plan view of one toolbar in unfolded or operating mode showing rake wheel spacings.

Due to the inward offset of the forward rake wheels 630, 830, a distance between the rake wheels 630 nearest each caster wheel 600 must be increased to provide appropriate spacing for operation. This is illustrated in FIGS. 22 and 23. In the operating position (unfolded) shown in FIG. 22, the rake wheel hubs are transversely equidistant—distance x—from one another so no forage is missed in the raking operation. As seen in FIG. 23, the axial distance between the rake wheels 630, 830, indicated as a, and b, varies. Distance a is the standard distance, and the distance used in the prior art. The distance b is the increased spacing required for caster wheel 600 clearance. The increased spacing b is necessary for achieving the equidistant spacings x when points of attachment of the rake wheel pivot arms to the toolbar 200, 300 have been offset inward in the vicinity of the caster wheels 600.

Figure 1:
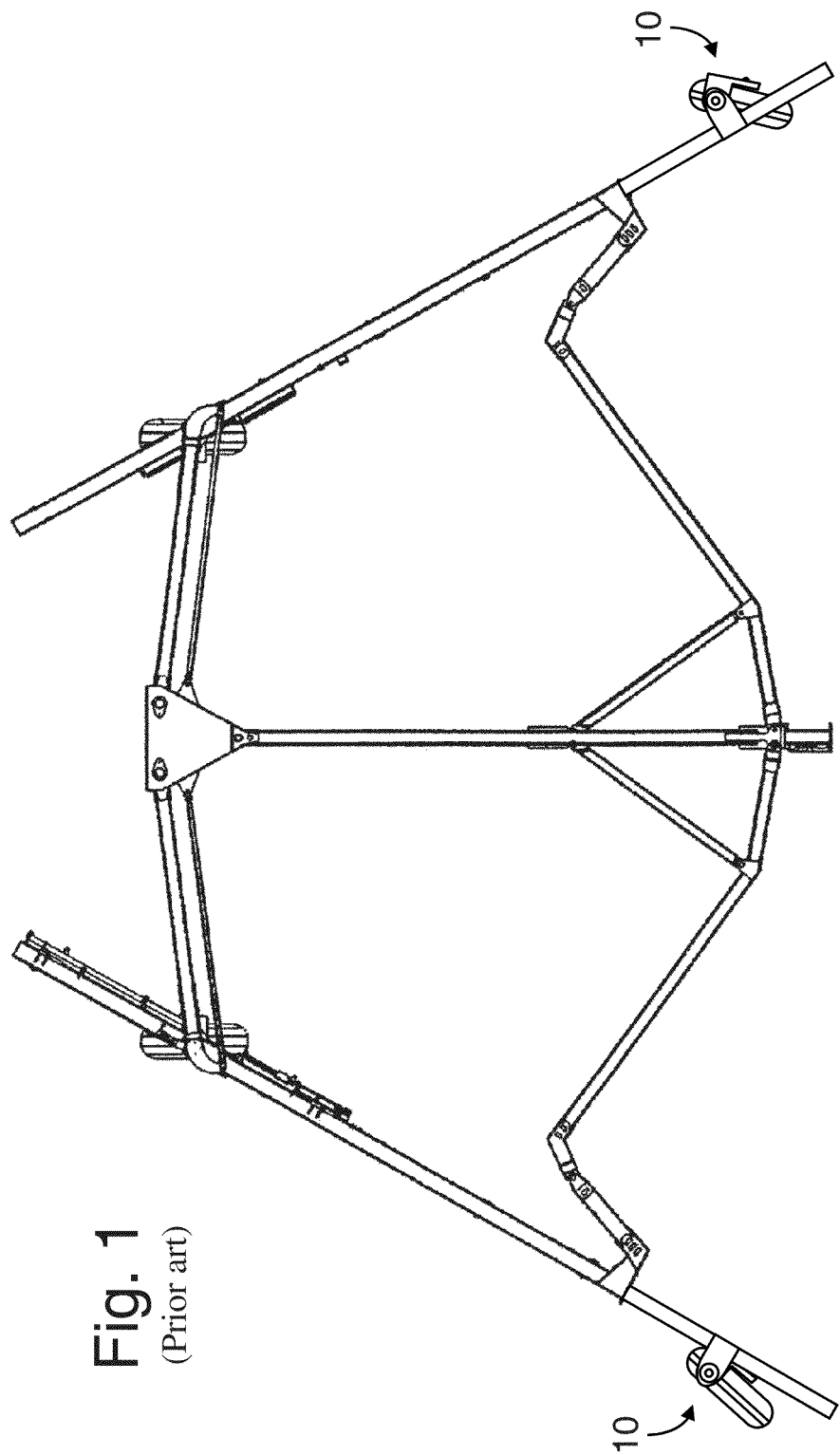
FIG. 1 is a top plan view of an agricultural wheel rake of the prior art.
Figure 2B:
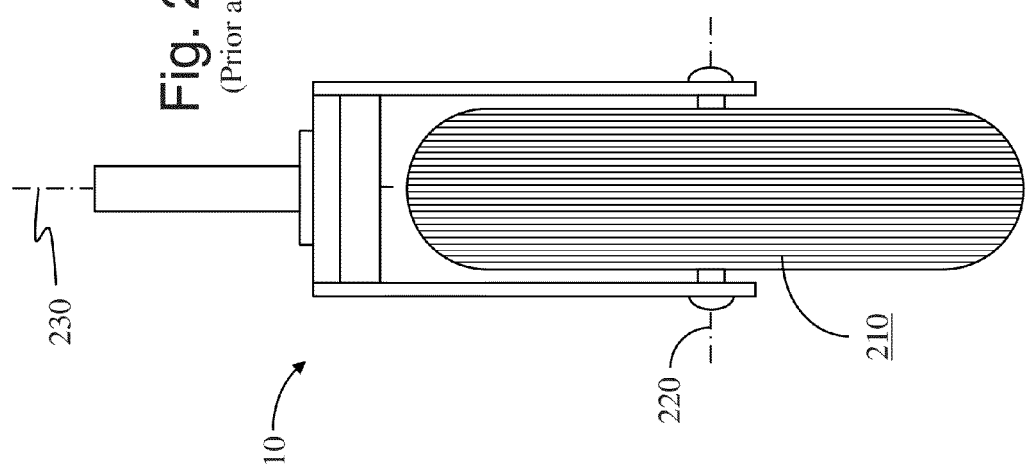
FIG. 2b is a front elevation view of the caster wheel assembly of the prior art.
Figure 2A:
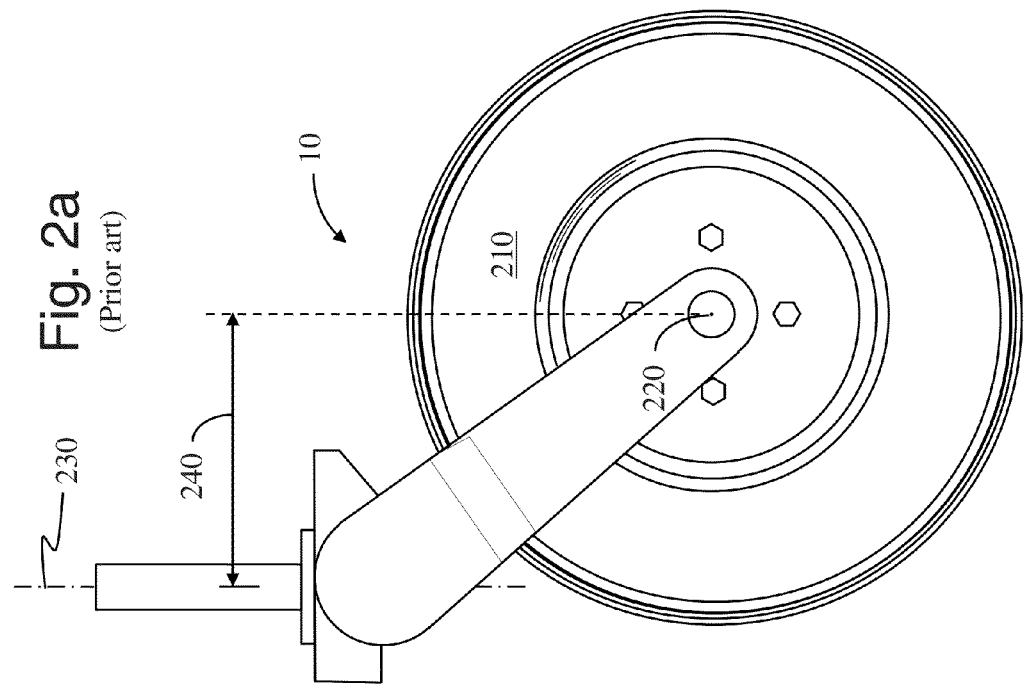
FIG. 2a is a side elevation view of a caster wheel assembly of the prior art.

Unlike the toolbar of the prior art, FIG. 1, where the substantially vertical axis of rotation 230 of the castor wheel assembly 10 is disposed outwardly from the toolbar, the axis of rotation 230 of the castor wheel assembly 600 the instant invention is located at or near the line 320 passing through the middle of a center portion of the toolbar section 200, 300. One advantage realized from this arrangement is better support of the moment applied to the toolbar 200, 300 by the raking action. An additional advantage is realized by a narrower frontal profile when the implement is folded for transport, as shown in FIG. 4.

Another aspect of the present invention comprises a frame and mechanical linkage for supporting a toolbar in a configuration that allows it to follow the terrain while minimizing strains in the toolbar and frame. The components may be simplified and the resulting product can be manufactured in a cost effective manner while providing high reliability and durability.

For the preferred embodiment, the wheel rake, two types of assemblies are connected to the toolbar: rake wheel assemblies and a caster wheel. Both create a torque load or moment on the toolbar due to the fact that the weight and operating loads are applied at points offset from the centerline of the toolbar. The torque load is counteracted by the supporting linkage. Many prior art rakes have utilized the linkage at the rear of the toolbar to provide the requisite capability to counteract this torque and hold the toolbar from rotating at the rear connection to the frame. In the prior art as shown in FIG. 1, the rear connection is used to counteract this torque and position the rear of the toolbars, to set the width of the resulting windrow. A linkage at the front, the fold arm, is then used to position the front of the toolbar. These configurations have been adequate, and successful in managing deformations of the frame members. However, when encountering variations in terrain, the relative positions of the front and rear of the toolbar need to change to follow the terrain as seen in FIG. 6. Mechanisms have been developed with relatively complicated designs, including complicated fold arms, to attempt to allow the necessary movement of the toolbar without inducing binding situations in the linkages.

The present invention utilizes a relatively simple fold arm 400, 500, configured to position the front of the toolbars 200, 300 between an operating position (FIG. 3) and a transport position (FIG. 4) while a rear support, connected to the main frame 107, sets the position of the rear of the toolbar 200, 300. The rear mechanism of this invention is configured to provide three degrees of rotational freedom in a novel combination with the front fold arm 400, 500 serving as the only means of rotationally positioning the toolbar 400, 500 about its centerline as required to counteract the offset load of the rake wheels 630, 830 and the caster wheel 600. As a result, the assembly can be optimized and the size of the components minimized, while maintaining or increasing expected durability.

Figure 14:
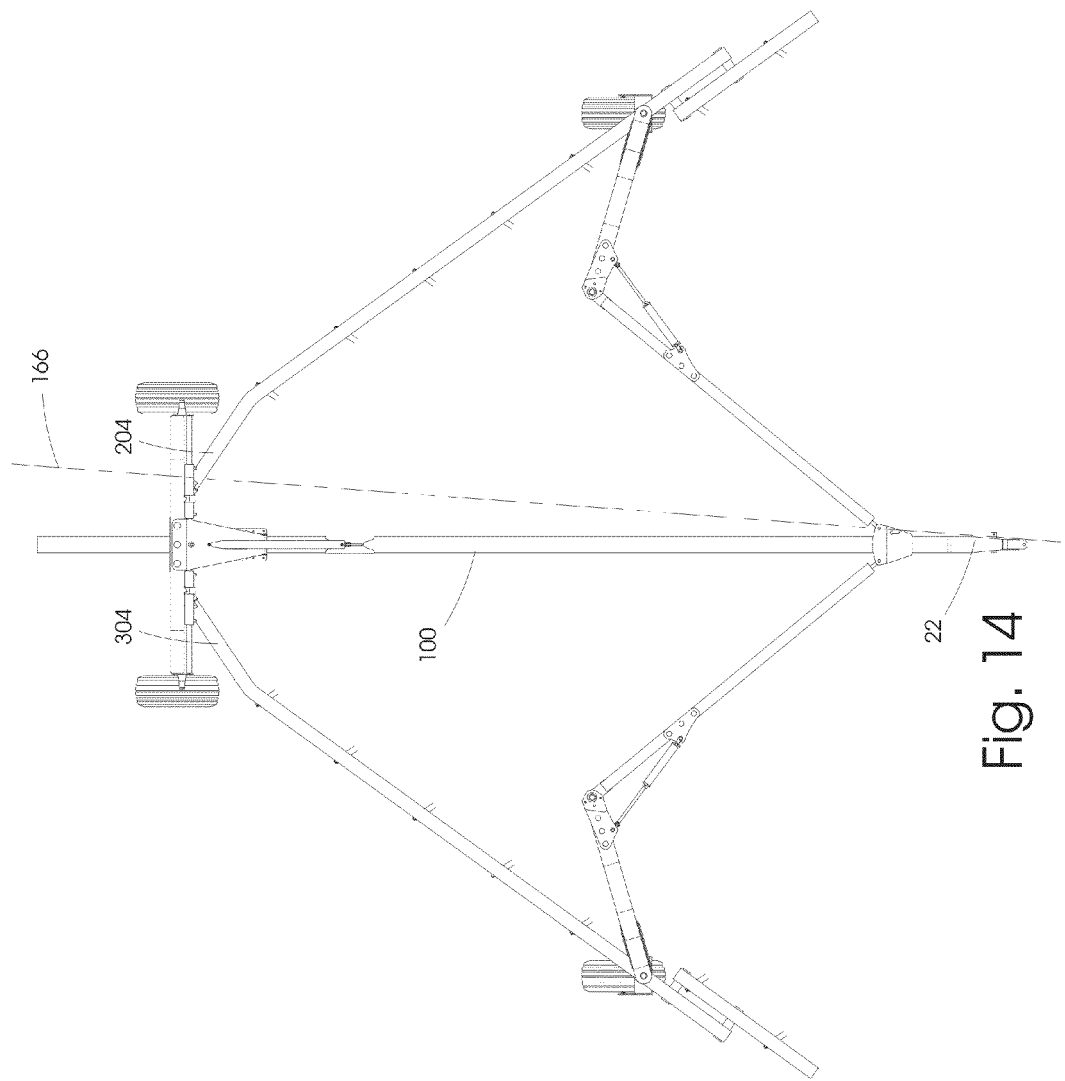
FIG. 14 is a top plan view of an agricultural implement frame in operating position showing an axis of rotation for a narrow disposition of the toolbars.
Figure 15:
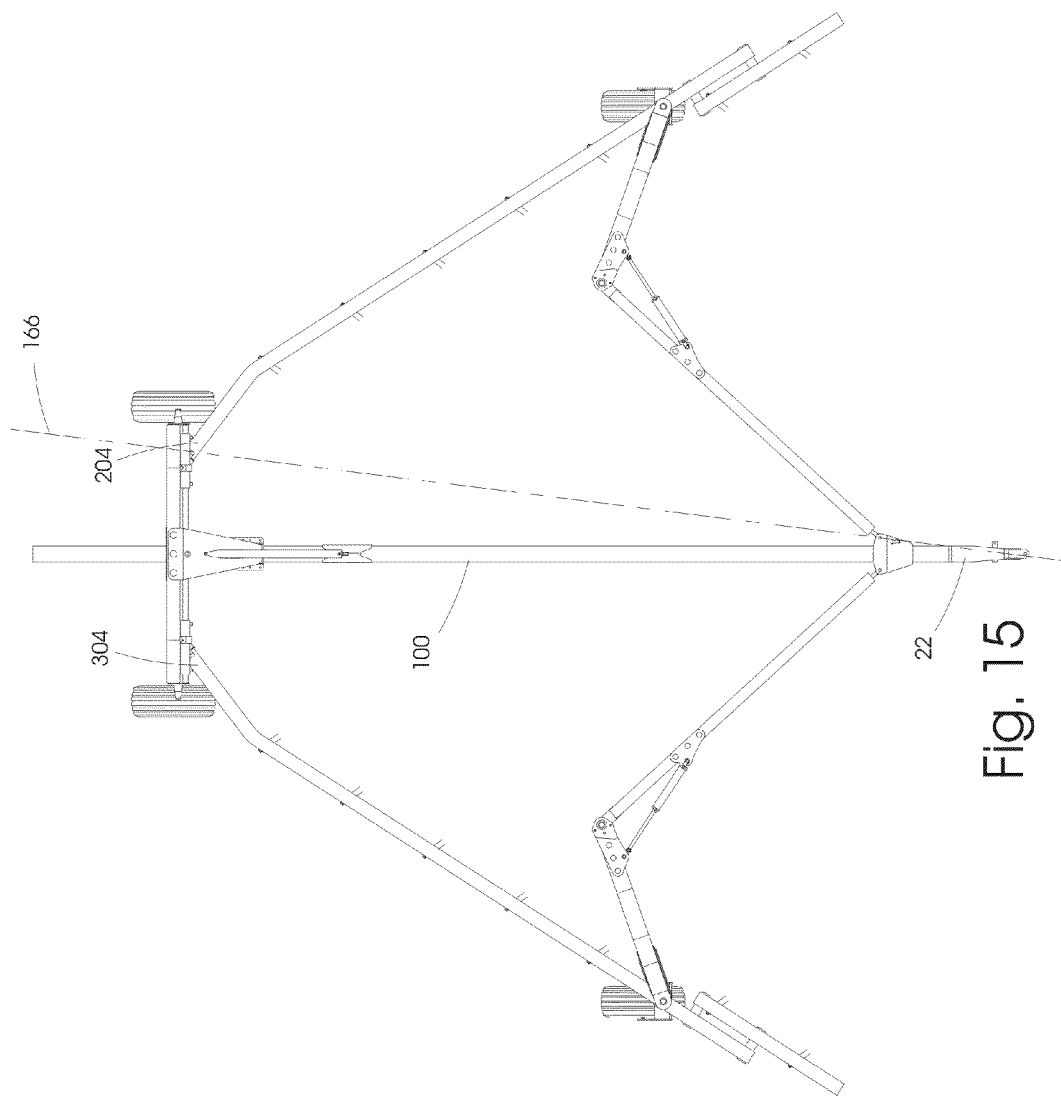
FIG. 15 is a top plan view of an agricultural implement frame in operating position showing an axis of rotation for a wide disposition of the toolbars.

As explained above and shown in FIGS. 3 and 4, includes the elongated tongue member 100, supported by the ground engaging wheels 102 rotatably mounted to the frame 107, the slide box 106 and the hitch 104. The frame 107 and slide box 106 support the left toolbar 200 and the right toolbar 300, each having a first end at the front, 202, 302, and a second end at the rear, 204, 304. The frame 107 supports both toolbars 200, 300 at the second end 204, 304 as illustrated in more detail in FIG. 11 where the support structure for the second end 204 of the left toolbar 200 is shown. The support structure includes a cylinder 110, comprising a cylinder ram 112 extending from the slide box 106 to the frame 107 and a body 114. The cylinder ram 112 defines a first axis of pivot 160 about which the respective toolbar 200, 300 may pivot. The cylinder's 110 body 114 is slidable relative to the ram 112 using common cylinder components, well known by those of ordinary skill in the art, such that the body 114 may slide longitudinally along the ram 112 as pressurized fluid is directed to either a first port 116 or a second port 118. When fluid is directed into the inner port 116, the cylinder body 114 will slide away from the tongue 100. Alternately, when fluid is directed to the outer port 118, the cylinder body 114 will slide toward the tongue 100. These movements allow the distance between the ends 204 and 304 of the toolbars to be altered as shown in FIGS. 14 and 15. In FIG. 14, the ends 204 and 304 have been moved toward the center as would be required to form a narrow windrow, while FIG. 15 shows the ends 204 and 304 moved apart, as would be required to form a wider windrow. In addition to moving longitudinally relative to the ram 112, the body 114 is able to freely rotate about the centerline of the ram 112, about the first pivotal axis 160.

Figure 12:
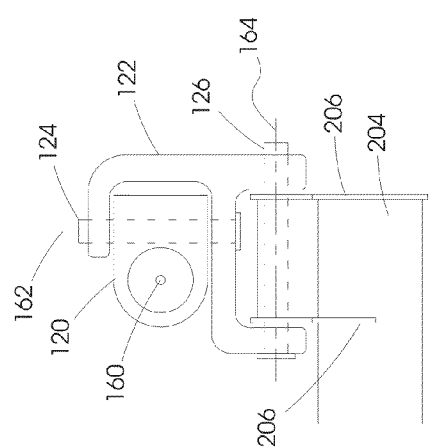
FIG. 12 is a detail of a hanger used at the rear toolbar connection point of the agricultural implement.

The body 114 includes a block 120 comprising a bored hole defining a second axis of pivot 162. The block 120 supports a mounting bracket 122, via a first pin 124 as shown in FIG. 12. The mounting bracket 122, in turn, supports the second end 204 of the toolbar 200 via a second pin 126, passing through holes in the mounting bracket 122 and through ears 206, welded to the toolbar 200. The centerline of the joint defined by the second pin 126, ears 206, and mounting bracket 122 defines a third axis of pivot 164.

The toolbars 200, 300 rotate about the second pivotal axis 162 when moved from the operating or raking configuration shown in FIG. 3 to a transport position shown in FIG. 4 as the cylinder 108 extends, moving the slide box 106 relative to the tongue member 100.

The first axis of rotation 160 allows the front end of the toolbar 202, 302 to move freely to follow the terrain, as shown by the front end 202 of the left toolbar 200 in a raised position, and the front end 302 of the right toolbar 300 in a lowered position in FIG. 6.

The front ends 202, 302 of the toolbars 200, 300 are positioned by fold arms 400, 500 shown in FIG. 3, with the rake in the operating position, and in FIG. 4 with the rake in the transport position. The toolbars 200, 300 are moved between these two positions by the cylinder 108 and the two fold arm cylinders 610, one of which is depicted in FIG. 9. The cylinder 108 may be extended or retracted via the hydraulic system of the tractor 80 to move the slide box 106 relative to the frame 107, and subsequently the rear portions of the toolbars 204, 304 relative to the front connection point of the fold arms 402, 502. This relative movement results in a rotational movement of the toolbars 200, 300.

Figure 8:
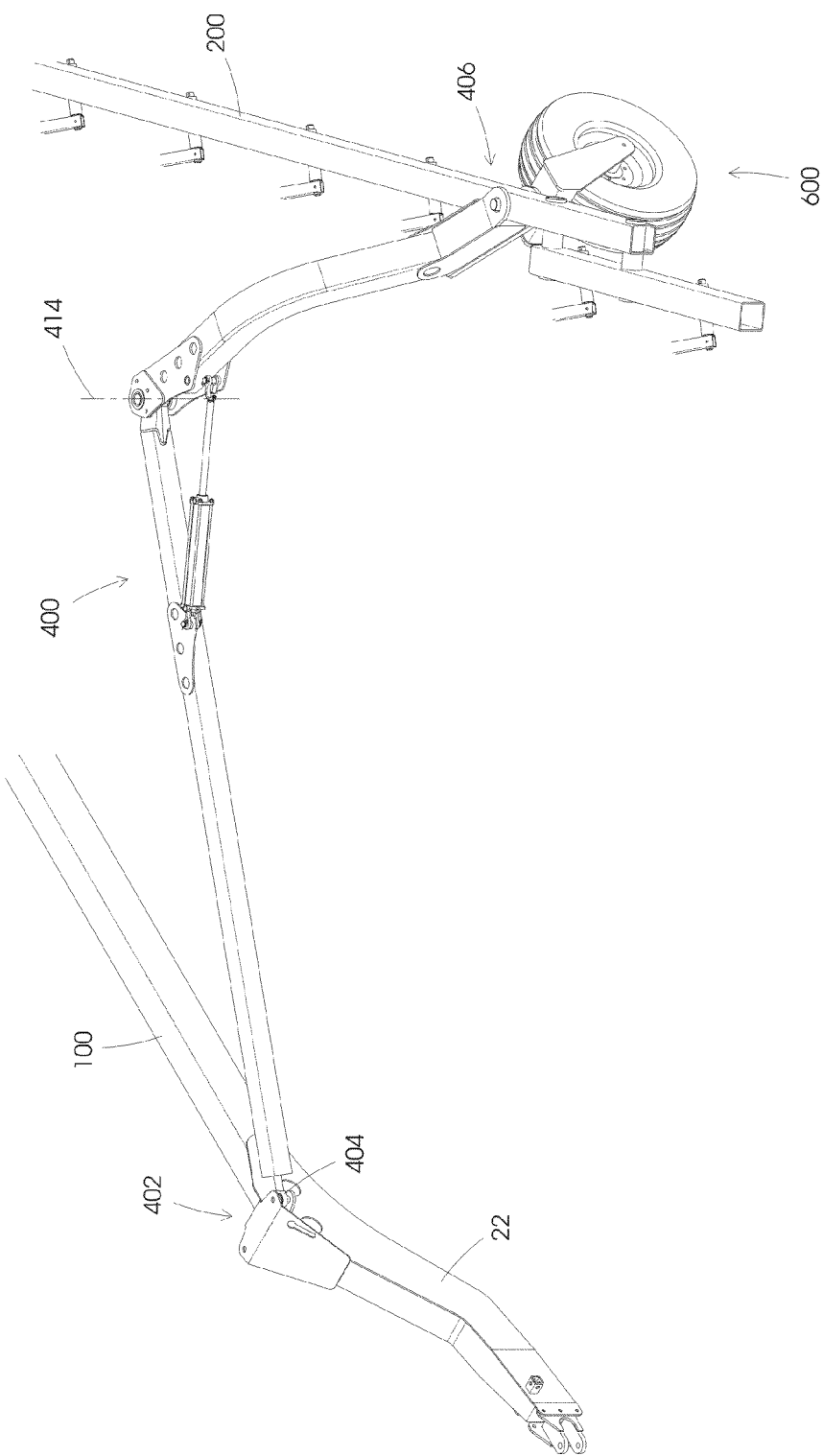
FIG. 8 is a detail of a fold arm of the agricultural implement.
Figure 10:
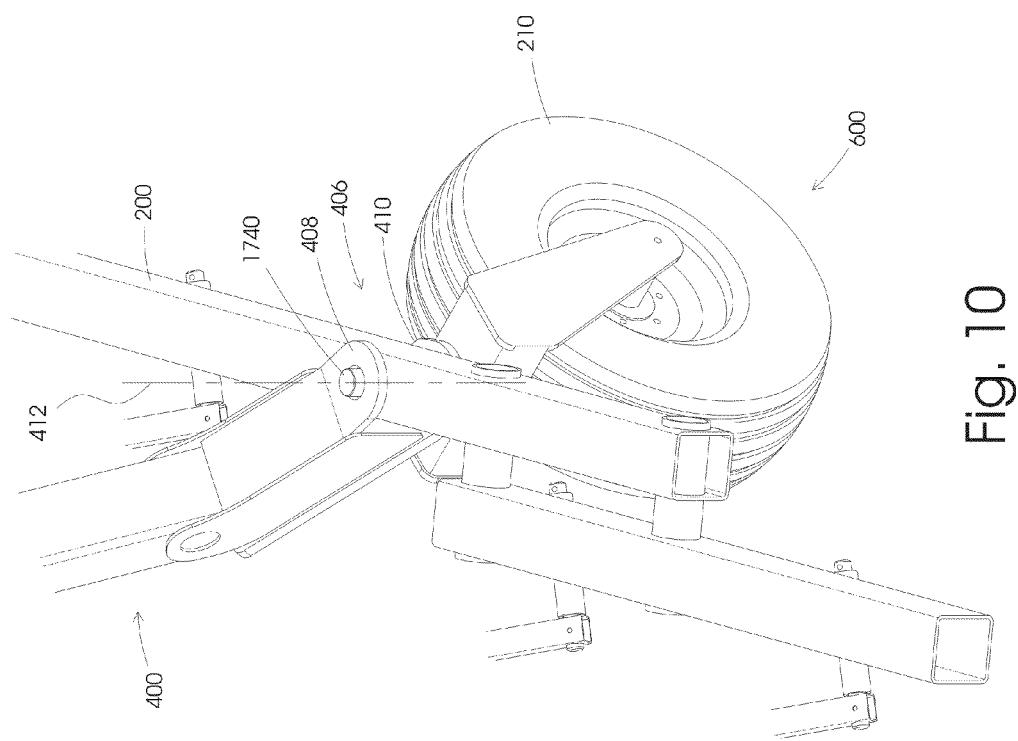
FIG. 10 is a detail of a fold arm and caster wheel pivot axis.
Figure 13:
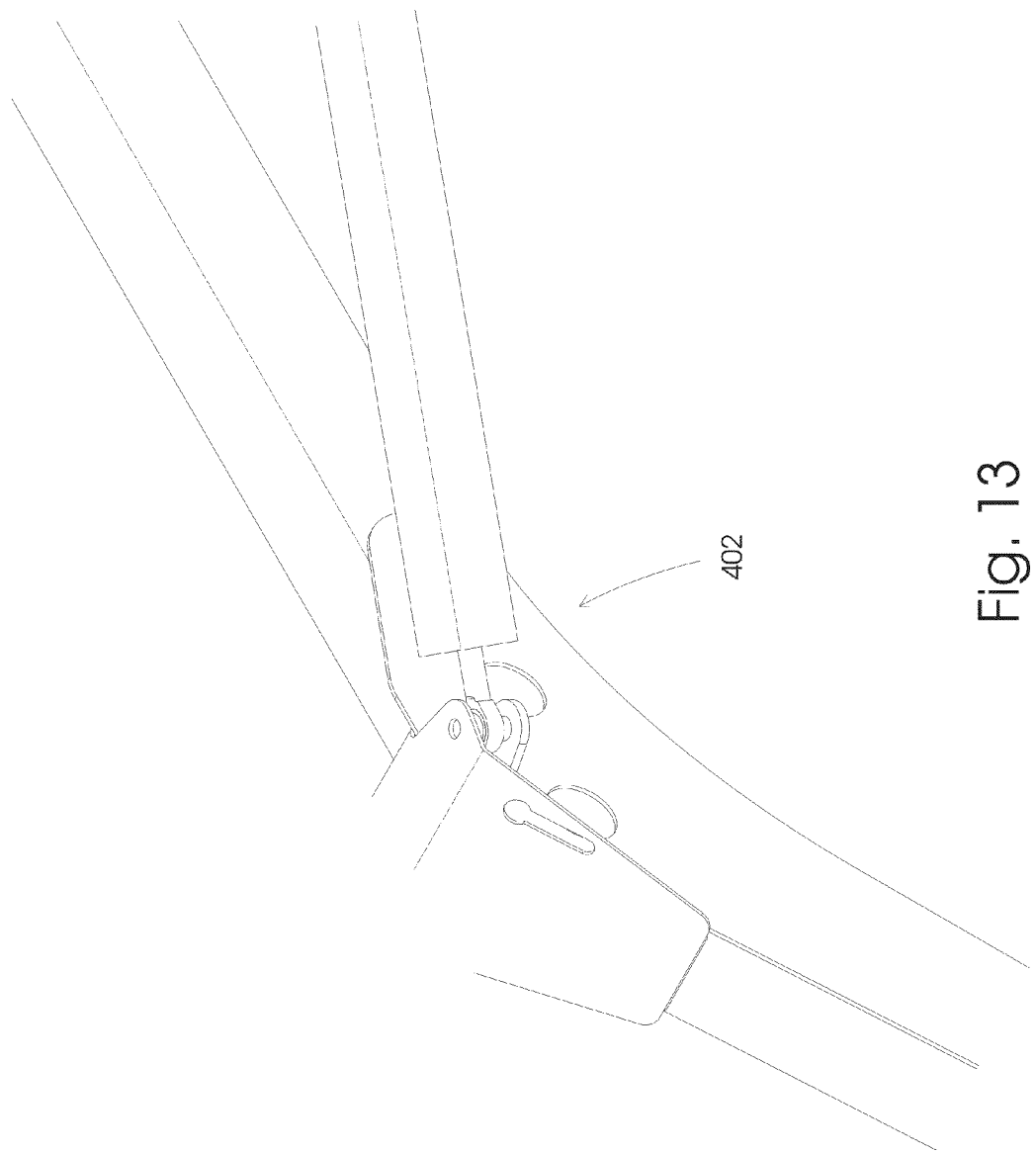
FIG. 13 is a detail of a ball joint between a tongue and the fold arm of the agricultural implement.

The left fold arm 400 can be seen in FIG. 8 to include a first end 404 attached to the tongue 100 at a connection point 402, via a ball joint, detailed in FIG. 13. Ball joints are known to provide three degrees of rotational freedom, and zero degrees of translational freedom. The opposite end 406 of the fold arm is connected to the left toolbar 200 at a joint providing one degree of rotational freedom, such as a cylindrical joint. In the preferred embodiment, as shown in FIG. 10, the connection is robust and includes a top plate 408 and a bottom plate 410 connected to the fold arm 400, configured to straddle the left toolbar 200. The top plate 408 and bottom plate 410 include holes aligned to define an axis of rotation 412. The caster wheel assembly 600 is includes the stem 1740 that passes through a first ear 410, left toolbar 200, and a second ear 408 in a manner that the left fold arm 400 directly supports the left caster wheel assembly 600, while using the same joint to support the left toolbar 200. With this configuration, the forces from the left caster wheel assembly 600 are transferred directly to the left fold arm 400.

Figure 5:
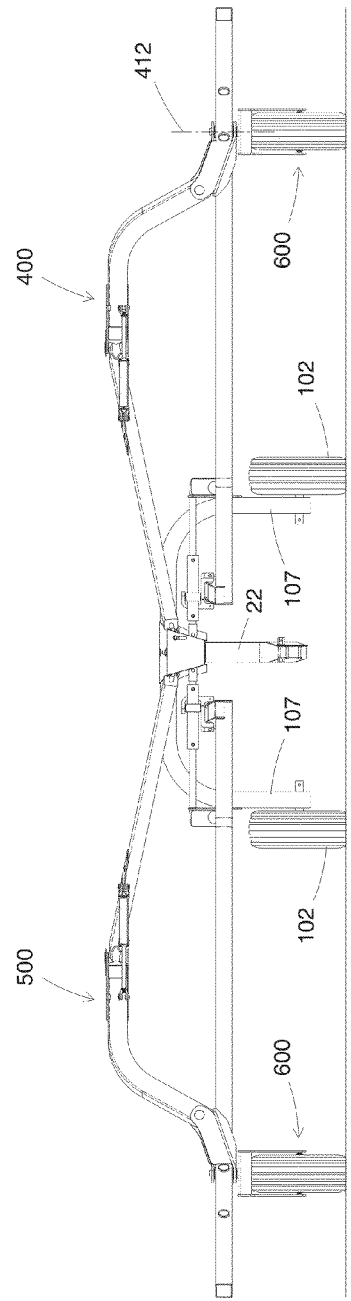
FIG. 5 is a first front elevation view of an agricultural implement frame in operating position.

Each of the fold arms 400, 500 positions the front end of the toolbar 200, 300 by changing length as provided by a joint rotating about a substantially vertical pivot axis 414 (FIGS. 8 and 9), provided on both fold arms 400, 500, which allows the fold arm 400, 500 to pivot in a substantially horizontal plane and controls the rotational position of the entire toolbar 200, 300 by pivoting about the substantially vertical pivot axes 412, 414. Because these substantially vertical pivot axes 412, 414 disallow rotation about any other axis, the orientation of the left toolbar 200 relative to the left fold arm 400 is maintained rigid to the limits of the deformation of the materials used to manufacture the implement. This can be seen by comparing FIGS. 5 and 6. In FIG. 6 the front of the left toolbar 200 has climbed onto a slight hill causing the left fold arm 400 to rotate about the connection 402 to the elongated tongue member 100 on a substantially horizontal pivot axis as enabled by the ball joint in a counterclockwise direction. Since the pivot axis 412 does not permit rotation about a substantially horizontal axis at the left toolbar 200, the pivot axis 412 is thus likewise pivoted in a counterclockwise direction. Hence, the left toolbar 200 is also rotated through an equal angular displacement in the counterclockwise direction. The rear connection to the main frame, as described earlier and depicted in FIGS. 11 and 12, will allow this angular displacement by allowing free angular movement about both the first pivot axis 160 and the third pivot axis 164.

This novel combination provides a fold arm 400, 500 configured to control the position of the front of a toolbar 200, 300 by folding in the substantially horizontal plane between an operating position and a transport position, while remaining rigid in a vertical plane. During mower operation, the fold arm 400, 500 is essentially a rigid member in any plane, positioning the front of the toolbar in the substantially horizontal plane. The fold arm 400, 500 also positions the toolbar 200, 300 in a vertical plane, controlling the toolbar's 200, 300 position as the offset load of the caster wheel assembly 600 and rake wheel assemblies 630, 830 induce a torque load on the toolbar 200, 300 generally about its longitudinal axis. The rear support for the toolbar provides three degrees of rotational freedom allowing the fold arm 400, 500 to exclusively counteract this induced torque in the toolbar 200, 300.

Figure 11:
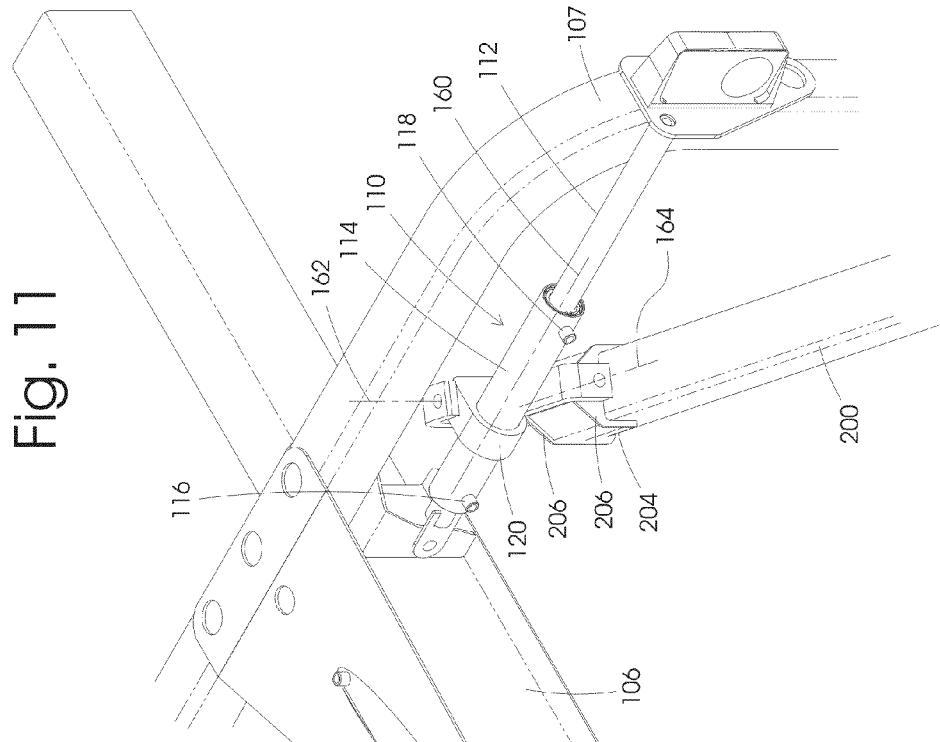
FIG. 11 is a detail of a rear toolbar connection point of the agricultural implement.

In the operating position, the fold arms 400, 500 act as rigid members connected to the tongue with ball joints at their respective pivots 402, 502, and to the front end of the toolbars 200, 300 at uniaxial cylindrical pivots. The toolbars 200, 300 are connected on their opposite ends to the frame 107 with a system of pivoting joints as shown in FIGS. 11 and 12 for the left toolbar 200, free to rotate about the first, second, and third pivot axes 160, 162, and 164. The toolbars 200, 300 will pivot about axes of rotation as shown in FIGS. 7, 14 and 15, where only one axis 166 for the left toolbar 200 is shown. This axis of rotation passes through the pivot 402 and the rear connection to the frame. Due to the fact that the ball joint at pivot 402 is higher than the rear connection at axes 160, 162 and 164, and the resulting orientation of the axis of rotation 166, the caster wheel assembly 600 will tend to move generally forward and out as the caster wheel assembly 600 is raised up, for instance when traveling over an obstruction.

It is to be understood, the explanations of the present invention for the left members of the apparatus are also applied to the right members.

The embodiments of the novel suspension system herein described may be utilized for many implements making use of a toolbar. The invention is not intended to be limited to forage wheel rakes.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

The invention claimed is:

1. An apparatus comprising:
   (a) an elongated tongue member of fixed length having a front end and a rear end and being adapted at the front end thereof to be operatively attached to a towing prime mover;

(b) a frame operatively slideably attached to the rear end of the elongated tongue member, said frame disposed in a transverse orientation relative to the elongated tongue member and slidable between a transport position closer to the rear end of the elongated tongue member and an operating position forward of the transport position thereof;
(c) an actuator operatively attached to the elongated tongue member at a first end, and operatively attached to the frame at a second end to transform the apparatus between the transport position and the operating position;
(d) wherein the tongue is non-telescopic; and
(e) ground engaging wheels operatively attached to the frame for permitting the frame to be moved at least in a forward direction, at least one of the ground engaging wheels being rotatable about a substantially horizontal axis, at least some of the time said axis being fixed with respect to the frame as the frame moves with respect to the tongue member between the transport and operating position.

2. The apparatus of claim 1 additionally comprising:
(a) a first toolbar operatively pivotally attached to the frame;
(b) a first joint that provides three degrees of rotational freedom, said joint also provides the operatively pivotal attachment of the first toolbar to the frame;
(c) a second toolbar operatively pivotally attached to the frame; and
(d) a second joint that provides three degrees of rotational freedom, said joint also provides the operatively pivotal attachment of the second toolbar to the frame.

3. The apparatus of claim 2 additionally comprising:
(a) a first ground engaging caster wheel operatively pivotally attached to the first toolbar along a first substantially vertical axis that passes through the first toolbar; and
(b) a second ground engaging caster wheel operatively pivotally attached to the second toolbar along a second substantially vertical axis that passes through the second toolbar.

4. The apparatus of claim 1 additionally comprising:
(a) a first fold arm operatively pivotally attached at a first inside end to the elongated tongue member by a first ball joint and operatively pivotally attached at a first outside end to a first toolbar by a first cylindrical joint having a first substantially vertical axis; and
(b) a second fold arm operatively pivotally attached at a second inside end to the elongated tongue member by a second ball joint and operatively pivotally attached at a second outside end to a second toolbar by a second cylindrical joint having a second substantially vertical axis.

5. The apparatus of claim 4 additionally comprising:
(a) a first knuckle joint having a third substantially vertical axis and disposed between the first inside end and the first outside end of the first fold arm; and
(b) a second knuckle joint operatively having a fourth substantially vertical axis and disposed between the second inside end and the second outside end of the second fold arm.

6. The apparatus of claim 2 additionally comprising:
(a) a first width adjusting actuator operatively attached to the frame and to the first toolbar for selectively adjusting a distance between the elongated tongue member and the first joint; and (b) a second width adjusting actuator operatively attached to the frame and to the second toolbar for selectively adjusting a distance between the elongated tongue member and the second joint.

7. The apparatus of claim 2 further comprising:
(a) a first raking device operatively attached to the first toolbar; and
(b) a second raking device operatively attached to the second toolbar.

8. An apparatus comprising:
(a) an elongated tongue member having a front end and a rear end and being adapted at the front end thereof to be operatively attached to a towing prime mover;
(b) a frame operatively slideably attached to the rear of the elongated tongue member between a transport position closer to the rear end of the elongated tongue member and a working position forward of the transport position thereof;
(c) ground engaging wheels operatively attached to the frame for permitting the frame to be moved in at least a forward direction, at least one of the ground engaging wheels being rotatable about a substantially horizontal axis which, at least some of the time when the frame is moving with respect to the tongue member, is fixed with respect to the frame;
(d) a first toolbar operatively pivotally attached to the frame with a first joint having three degrees of rotational freedom, the first toolbar having one end thereof that is close to the elongated tongue member in the transport position and farther from the tongue member in the working position than in the transport position thereof;
(e) a second toolbar operatively pivotally attached to the frame with a second joint having three degrees of rotational freedom, the second toolbar having one end thereof that is close to the elongated tongue member in the transport position and farther from the tongue member in the working position than in the transport position thereof; and
(f) the elongated tongue member having a front end and a rear end, the rear end of the elongated tongue member being rear of the frame in the working position thereof.

9. The apparatus of claim 8 further comprising:
(a) a first width adjusting actuator operatively attached to the frame and to the first toolbar for selectively adjusting a distance between the elongated tongue member and the first joint; and
(b) a second width adjusting actuator operatively attached to the frame and to the second toolbar for selectively adjusting a distance between the elongated tongue member and the second joint.

10. The apparatus of claim 8 further comprising:
(a) a first raking device operatively attached to the first toolbar; and
(b) a second raking device operatively attached to the second toolbar.

11. A method of using a folding implement frame, the implement frame comprising a tongue member having a tongue longitudinal axis, a frame having a frame longitudinal axis, ground engaging wheels operatively attached to the frame for permitting the frame to be moved at least in a forward direction, at least one of the ground engaging wheels being rotatable about substantially horizontal axis, at least some of the time said axis being fixed with respect to the frame as the frame moves with respect to the tongue member between the transport and operating position, and an actuator, said tongue member not being telescoping, the method comprising:

(a) operatively slidably attaching the frame to the tongue member;
(b) disposing the frame longitudinal axis substantially perpendicular to the tongue longitudinal axis;
(c) operatively attaching a first end of the actuator to the tongue member;
(d) operatively attaching a second end of the actuator to the frame; and
(e) altering a position of the frame relative to the tongue member through actuation of the actuator whereby the frame longitudinal axis remains substantially perpendicular to the tongue longitudinal axis.

12. The method of claim 11 wherein the implement frame additionally comprises a left toolbar, a right toolbar, a left fold arm, and a right fold arm, the method additionally comprising:
(a) operatively pivotally attaching a rear end of the left toolbar to the frame on a left joint permitting three degrees of rotational freedom;
(b) operatively pivotally attaching an inner end of the left fold arm to the tongue member on a left ball joint;
(c) operatively pivotally attaching an outer end of the left fold arm to the left toolbar on a left cylindrical joint having a first substantially vertical axis;
(d) operatively pivotally attaching a rear end of the right toolbar to the frame on a right joint permitting three degrees of rotational freedom;
(e) operatively pivotally attaching an inner end of the right fold arm to the tongue member on a right ball joint;
(f) operatively pivotally attaching an outer end of the right fold arm to the right toolbar on a right cylindrical joint having a second substantially vertical axis; and
(g) folding forward ends of the right toolbar and the left toolbar towards the tongue member when the position of the frame is actuated toward the rear of the tongue member.

13. A method of using a folding dual toolbar apparatus of a type having a frame with a longitudinal axis and having transport wheels operatively attached to the frame, at least one of the transport wheels being rotatable about a substantially horizontal axis which, at least some of the time when the frame is moving with respect to the tongue member, is fixed with respect to the frame, a tongue member, the frame being operatively slideably attached to the tongue member, the tongue member having an longitudinal axis disposed transversely with respect to the longitudinal axis of the frame, the tongue member being adapted to be attached at the front thereof to a prime mover so that the folding dual toolbar apparatus can be towed forwardly from place to place, the tongue member having a front end and a rear end, first and second toolbars pivotally attached at a rear end thereof to the frame at first and second joints having three degrees of rotational freedom, the first and second toolbars also having respective front ends, and linkage members operatively attached respectively between the first and second toolbars and the tongue member, the method comprising:
(a) moving the frame rearwardly with respect to the tongue member in a direction parallel to the longitudinal axis of the tongue member and using the movement of the frame with respect to the tongue member to simultaneously pull forwardly the front ends of the first and second toolbars towards the tongue member to thereby cause the folding dual toolbar apparatus to be in a transport position; and
(b) moving the frame forwardly with respect to the tongue member along the longitudinal axis of the tongue member so that the rear end of the tongue member is disposed behind the frame while simultaneously using the movement of the tongue member, through the linkage members, to push the forward ends of the first and second toolbars away from the tongue member to thereby cause the folding dual toolbar apparatus to be in a working position thereof.

14. The method of claim 13 further comprising:
(a) using a first width adjusting actuator operatively attached to the frame and to the first toolbar for selectively adjusting a distance between the tongue member and the first joint; and
(b) using a second width adjusting actuator operatively attached to the frame and to the second toolbar for selectively adjusting a distance between the tongue member and the second joint.

15. The method of claim 13 further comprising:
(a) attaching a first raking device to the first toolbar; and
(b) attaching a second raking device to the second toolbar.

16. An apparatus for an agricultural implement comprising:
(a) an elongated tongue member having a front end and a rear end and being adapted at the front end thereof to be operatively pivotally attached to a towing prime mover;
(b) a frame operatively attached to the rear end of the elongated tongue member;
(c) ground engaging wheels operatively attached to the frame for permitting the frame to be moved at least in a forward direction, at least one of the ground engaging wheels being rotatable about a substantially horizontal axis, at least some of the time said axis being fixed with respect to the frame as the frame moves with respect to the tongue member between the transport and operating position;
(d) a toolbar operatively pivotally attached to the frame on a first joint providing three degrees of rotational freedom; and
(e) a fold arm operatively pivotally attached to the elongated tongue member at an inner end and operatively pivotally attached to the toolbar at an outer end.

17. The apparatus of claim 16 additionally comprising a ball joint by which the inner end of the fold arm is operatively pivotally attached to the elongated tongue member.

18. The apparatus of claim 17 additionally comprising:
(a) a cylindrical joint having a first substantially vertical axis of pivot by which the fold arm is operatively pivotally attached to the toolbar at the outer end; and
(b) a knuckle disposed in the fold arm and disposed between the inner end and the outer end, said knuckle having a second substantially vertical axis of pivot.

19. The apparatus of claim 18 additionally comprising a caster wheel comprising a substantially vertical axis of rotation disposed collinear with the first substantially vertical axis of pivot.

20. A method of providing folding of an agricultural implement, said agricultural implement comprising an elongated tongue member having a longitudinal axis, a front end and a rear end and being adapted at the front end thereof to be operatively pivotally attached to a towing prime mover, a frame having a longitudinal axis oriented substantially perpendicular to the longitudinal axis of the elongated tongue member, ground engaging wheels operatively attached to the frame for permitting the frame to be moved at least in a forward direction, at least one of the ground engaging wheels being rotatable about a substantially horizontal axis, at least some of the time said axis being fixed with respect to the frame as the frame moves with respect to the tongue member between the transport and operating position, a toolbar, and a fold arm, said method comprising:
(a) operatively attaching the frame to the rear end of the elongated tongue member;
(b) operatively pivotally attaching the toolbar to the frame on a first joint providing three degrees of rotational freedom;
(c) operatively pivotally attaching the fold arm to the elongated tongue member at an inner end; and
(d) operatively pivotally attaching the fold arm to the toolbar at an outer end.

21. The method of claim 20 wherein operatively pivotally attaching the fold arm to the elongated tongue member at an inner end comprises operatively pivotally attaching the inner end of the fold arm to the elongated tongue member using a ball joint.

22. The method of claim 20 wherein operatively pivotally attaching the fold arm to the toolbar at an outer end comprises operatively pivotally attaching the fold arm to the toolbar at an outer end using a cylindrical joint having a first substantially vertical axis of pivot.

23. The method of claim 20 additionally comprising:
(a) constructing the fold arm so it comprises two portions: an inner portion and an outer portion;
(b) hinging the inner portion of the fold arm to the outer portion of the fold arm with a knuckle disposed between the inner portion and the outer portion, said knuckle having a second substantially vertical axis of pivot.

24. The method of claim 22 additionally comprising operatively rotationally attaching a caster wheel to the toolbar on a substantially vertical axis of rotation disposed collinear with the first substantially vertical axis of pivot.

25. The method of claim 24 wherein the substantially vertical axis of rotation passes through the toolbar.

* * * * *